United States Patent
Kurz

(10) Patent No.: US 10,821,612 B2
(45) Date of Patent: Nov. 3, 2020

(54) SUCTION GRIPPER SYSTEM FOR HANDLING AT LEAST ONE ARTICLE

(71) Applicant: Carl Zeiss Vision International GmbH, Aalen (DE)

(72) Inventor: Norbert Kurz, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 16/355,975

(22) Filed: Mar. 18, 2019

(65) Prior Publication Data
US 2019/0291283 A1    Sep. 26, 2019

(30) Foreign Application Priority Data

Mar. 20, 2018 (EP) ..................................... 18162828

(51) Int. Cl.
*B25B 11/00* (2006.01)
*B25J 15/06* (2006.01)
*B25J 15/00* (2006.01)

(52) U.S. Cl.
CPC ....... *B25J 15/0658* (2013.01); *B25J 15/0616* (2013.01); *B25J 15/0683* (2013.01); *B25B 11/005* (2013.01); *B25J 15/0028* (2013.01)

(58) Field of Classification Search
CPC .............................. B25B 11/00; B25B 11/005
See application file for complete search history.

(56) References Cited

U.S. PATENT DOCUMENTS

| 4,841,677 A * | 6/1989 | Kotting ................... B24B 9/146 248/205.8 |
| 6,655,671 B2 * | 12/2003 | Iwaki .................. H05K 13/0069 269/21 |
| 9,296,160 B2 | 3/2016 | Clements et al. | |
| 2002/0014732 A1 * | 2/2002 | Isogai ................ H05K 13/0069 269/21 |

(Continued)

FOREIGN PATENT DOCUMENTS

CN    102481736 A    5/2012
DE    20 2010 015 939 U1    3/2011

(Continued)

OTHER PUBLICATIONS

Extended European Search Report issued by the European Patent Office in EP 18 162 828.0, to which this application claims priority, dated Sep. 19, 2018, and English-language translation thereof.

(Continued)

*Primary Examiner* — Lee D Wilson
(74) *Attorney, Agent, or Firm* — Thrive IP®; Georg Hasselmann

(57) ABSTRACT

A suction gripper system includes a suction calotte for the handling of at least one article and a counterpart configured correspondingly to the suction calotte. Further, the suction gripper system includes a magnetic element and a movably mounted ball, which are arranged to interact magnetically with respect to one another to influence a spatial position of the suction calotte in relation to the counterpart. Further, a method for handling the at least one article, a method for producing at least one spectacle lens, and the use of the suction gripper system are disclosed.

16 Claims, 6 Drawing Sheets

(56) References Cited

U.S. PATENT DOCUMENTS

2013/0221589 A1* 8/2013 Mandler ............... B23Q 3/088
269/21
2016/0111318 A1* 4/2016 Ichinose ............... G03F 7/707
430/322
2019/0291283 A1* 9/2019 Kurz .................... B25J 15/0658

FOREIGN PATENT DOCUMENTS

KR        101504174 B1    3/2015
WO     2017043895 A2    3/2017

OTHER PUBLICATIONS

Intention to Grant issued by the European Patent Office in EP 18 162 828.0, to which this application claims priority, dated Dec. 4, 2019, and English-language translation thereof.
Office action by the Chinese Patent Office issued in CN201910213269.0, which is a counterpart hereof, dated Jun. 8, 2020, and English-language translation thereof.

\* cited by examiner

SUCTION GRIPPER SYSTEM FOR HANDLING AT LEAST ONE ARTICLE

CROSS REFERENCE TO RELATED APPLICATIONS

This application claims priority to European patent application EP 18 162 828.0 filed on Mar. 20, 2018, which is hereby incorporated by reference in its entirety.

TECHNICAL FIELD

The present disclosure relates to a suction gripper system and to a method for handling at least one article, to a method for producing at least one spectacle lens, and to a use of the suction gripper system. Here, the suction gripper system and the method may be configured in particular for acting with the lowest possible forces and friction on an article to be handled, in particular an optical element, typically spectacle lenses, typically for fixing and receiving the article with the suction gripper system.

BACKGROUND

The related art discloses devices for suctioning, lifting, transporting, and relocating workpieces. Such devices and methods have been used for decades in particular in the industrial manufacturing sector.

DE 20 2010 015 939 U1 discloses a generic suction gripper for suctioning, lifting, transporting, and relocating workpieces, composed of a housing, which on the bottom side is equipped with a rotary body on which at least one suction cup is arranged, wherein housing and rotary body have a vacuum-permeable opening, connected to a negative-pressure source, for the suctioning of the workpieces, wherein the rotary body is formed, on a top side, as a calotte and is spherically movably mounted on the housing, which on the bottom side is equipped with a bearing socket, wherein the calotte can be pulled into the bearing socket by means of at least one magnet.

Despite numerous advantages, this suction gripper still has potential for improvement. For example, a high expenditure of force is normally necessary during a setting-down of the suction cup, such that use in the case of articles with a sensitive surface is possible only to a limited extent. Furthermore, in general, a holding force of a magnet restricts a degree of mobility, for example the mobility between spherical calotte and ball socket. In particular, the holding force of the magnet may generally increase a friction force between the spherical calotte and the ball socket, whereby a high setting-down force onto the workpiece is necessary before the latter can perform a deflection about the system central point. In particular, a resetting from a deflected position into a neutral position is commonly possible only with an intermediate step, for example by a setting-down onto a planar surface or with an increased expenditure of force and a relative movement on a surface of the workpiece. Furthermore, the devices used in the related art for the resetting are generally, owing to the system, not capable of permitting a complete resetting, in particular a recentering.

SUMMARY

Against the background of DE 20 2010 015 939 U1, it is an object of the present disclosure to provide a suction gripper system and a method for handling at least one article, a method for producing at least one spectacle lens, and a use of the suction gripper system, which at least partially overcome the stated disadvantages and limitations of the related art.

This object is achieved with a suction gripper system and a method for handling at least one article, a method for producing at least one spectacle lens, and the use of the suction gripper system as disclosed herein.

Hereinafter the terms "exhibit," "have," "comprise," or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B," "A has B," "A comprises B," or "A includes B" can refer both to the situation in which no further element aside from B is provided in A, that is to say to a situation in which A consists exclusively of B, and to the situation in which, in addition to B, one or more further elements are provided in A, for example element C, elements C and D, or even further elements.

In a first aspect, the present disclosure relates to a suction gripper system for handling at least one article. The suction gripper system comprises a suction calotte for the handling of the at least one article and a counterpart configured correspondingly to the suction calotte. Furthermore, a magnetic element and a movably mounted magnetizable ball are provided, wherein the ball and the magnetic element are arranged in magnetically interactable fashion with respect to one another to influence a spatial position of the suction calotte in relation to the counterpart.

The expression "suction gripper system" refers basically to any device which is equipped for handling at least one article by using pressure, in particular a negative pressure which acts on the article. For this purpose, the suction gripper system comprises the suction calotte, which in the context of the present disclosure is basically to be understood to mean any element that is configured to adapt its position and/or form at least partially to the form and/or position of the article such that the handling of the article can be performed using the pressure, typically the negative pressure. In particular, the negative pressure can be used to fix the article relative to the suction calotte and consequently picked up by the suction calotte. Furthermore, by generating the negative pressure, the suction calotte can be fixed relative to the counterpart. In particular, spatial fixing of the suction calotte relative to the counterpart can be achieved for example by suctioning of the suction calotte onto the counterpart owing to the generation of the negative pressure. Furthermore, by the generation of the negative pressure, it is possible for the magnetic interaction, for example the interacting force, between the ball and the magnetic element to be overcome. For the application of the pressure, typically negative pressure, to the suction calotte, it is typically possible for at least one pressure system to be provided.

In the context of the present disclosure, the expression "handling" basically refers to non-destructive action on the article to be handled. This is typically to be understood to mean that the article can be fixed in relation to the suction gripper system or a part thereof, in particular in relation to the suction calotte, and can consequently be picked up by the suction gripper system, typically by the suction calotte.

In particular, the suction calotte or a cutout formed therein may have an entirely or at least partially spherically designed form. The expression "spherically designed form" refers here to a geometrical shape which at least approximately corresponds to a portion of a ball. Due to the resulting large possible degree of freedom during a rotation of the suction calotte, the suction calotte and the counterpart, which is configured correspondingly to the suction calotte, can typically interact with one another, for example similarly to an interaction of a joint. Here, the suction calotte and the counterpart of the suction gripper system may particularly typically be provided as mechanically mutually separate objects, which can be separated from one another in particular at a parting line, wherein the two objects may be detachably connected to one another, in particular with seals.

In the context of the present disclosure, the "counterpart" refers basically to any device which is configured correspondingly to the suction calotte. Here, the counterpart may be configured as a housing or as part of a housing, wherein the "housing" refers basically to any device which completely or partially encloses the suction gripper system and which typically imparts mechanical stability, and/or stability with respect to environmental influences, to the suction gripper system. In particular, the counterpart may be produced entirely or partially from at least one plastics material. Alternatively or in addition, the counterpart may also be produced entirely or partially from at least one metal, in particular from a metallic alloy, typically from a non-magnetic and/or non-magnetizable metal, such as for example aluminum, so as to impair the function of the ball as little as possible. The suction calotte may typically comprise a non-magnetizable material or an only slightly magnetizable material, whereas an ideally highly magnetizable material may typically be selected for the ball.

In the context of the present disclosure, the "pressure system" may basically be understood to mean any system that is configured to guide and/or conduct a pressure, in particular a force acting on a surface. For example, the pressure system may be configured to apply the pressure to a desired surface, and/or to transport the pressure to a desired surface. In particular, the pressure system may be configured to conduct the force onto at least a part of the surface of the article to be handled. Here, in the context of the present disclosure, a "pressure" may basically be understood to mean any force per unit of area. In particular, the pressure may be a force acting on an area, for example a positively or negatively acting force. The pressure may typically be a pressure which differs from an ambient pressure. In particular, the pressure may be a negative pressure, and the force per unit of area exerted by the pressure may for example be lower than a force per unit of area exerted by the ambient pressure.

In the context of the present disclosure, the "magnetizable ball" may basically be understood to mean any element which has a three-dimensional rotationally symmetrical form, for example the form of a ball, and which is configured to, under the influence of a magnetic field, intensify the latter and/or itself form a magnetic field. Deviations from the spherical form are however possible as long as the rotation of this movably mounted element is not impaired, or is only insignificantly impaired, as a result. The magnetizable ball may typically be entirely or partially produced from a ferromagnetic material, for example from a metal, in particular from iron, cobalt, and nickel, or a combination thereof. Alternatively or in addition, the magnetizable ball may also comprise a ferromagnetic plastic, in particular a magnetodielectric material, for example a thermoplastic equipped with soft iron particles.

In the context of the present disclosure, the "magnetic element" may basically be understood to mean any component which is configured to generate a magnetic field. The magnetic element may typically be a permanent magnet of ring-shaped form. The magnetic element may alternatively be selected from an electromagnet. Irrespective of the type of magnetic element, the magnetic element may spatially likewise be configured as a spherical calotte or typically as a magnetic disc. In a particularly exemplary embodiment, the magnetic disc may have a first surface and a second surface arranged opposite the first surface, wherein oppositely oriented magnetic poles of the magnetic element are situated opposite one another in each case on the first surface and on the second surface. In this way, it is possible for magnetic field lines to be generated that have a preferred orientation.

According to the present disclosure, it is proposed that the movably mounted magnetizable ball and the magnetic element be arranged in the suction gripper system in magnetically interactable fashion with respect to one another. For this purpose, it is possible in particular for the magnetic element to be configured so as to permit a magnetic interaction with the ball, in particular the magnetizable ball, in order to influence a spatial position of the suction calotte in relation to the counterpart. Here, the ball and the magnetic element may be arranged in magnetically interactable fashion with respect to one another to set a desired spatial position of the suction calotte and/or of the counterpart, for example. Furthermore, the ball and the magnetic element may be arranged in magnetically interactable fashion with respect to one another in order to return to an initial position, in particular to an initial position of the spatial position of the suction calotte in relation to the counterpart, without the action of external forces.

In the context of the present disclosure, the expressions "in magnetically interactable fashion" or "magnetic interaction" are basically to be understood to mean mutual influencing of the at least one magnetic element and of the magnetizable ball as a result of an action of force between the magnetic element and the ball. Here, the action of force between the magnetic element and the ball may be imparted by a magnetic field, in particular along the magnetic field lines generated by the magnetic element. Here, the magnetic field may in particular be generated by the magnetic element and act on the magnetizable ball. The magnetic element may in this case involve a magnet, a magnetized and/or magnetizable article, and/or moving electrical charges.

Furthermore, the counterpart may be configured for receiving a first element, whereas the suction calotte may be configured for receiving a second element which differs from the first element. In the context of the present disclosure, the expression "receiving" may basically be understood to mean any mounting of any element. For example, the first element received in the counterpart may be entirely or partially surrounded, for example, enclosed in at least one plane, by the counterpart. In particular, the second element received in the suction calotte may for example be entirely or partially surrounded, for example enclosed in at least one plane, by the suction calotte.

According to the disclosure, both the first element and the second element may be selected from the movably mounted magnetizable ball and the magnetic element, wherein, as already mentioned, the first element and the second element differ from one another. In an exemplary embodiment, it is thus possible for the counterpart to have the movably mounted magnetizable ball, whereas the suction calotte comprises the magnetic element. In an alternative embodiment, the counterpart may have the magnetic element, whereas the suction calotte comprises the movably mounted magnetizable ball.

In an exemplary embodiment, the suction calotte may comprise a suction attachment. In particular, the suction attachment may be configured to adapt to a part of a surface of the article. Furthermore, the suction attachment may be configured to close off the part of the surface of the article air-tightly. In particular, air-tight closing-off of the part of the surface may occur exactly when the suction calotte has had a negative pressure applied thereto. Typically, the suction attachment may in particular be configured to attach to only a part of the surface to prevent the entire article from being sucked in when the negative pressure is applied to the suction calotte.

In a further exemplary embodiment, the counterpart and the suction calotte may in particular be configured to form a cavity, which can be closed off air-tightly between the counterpart and the suction calotte. For example, the cavity, which can be closed off air-tightly between the counterpart and the suction calotte may be closed off air-tightly exactly when the suction calotte has had the negative pressure applied thereto. In particular, the cavity which can be closed off air-tightly may be capable of being formed by virtue of a region of the surface of the suction calotte and a sealing edge comprised by the counterpart being joined together.

The suction calotte may typically have a deflection stop connected fixedly thereto. For example, it may be possible for a relative movement of the suction calotte with respect to the counterpart to be restricted by the deflection stop. For example, the relative movement of the suction calotte with respect to the counterpart may be limited to an angle range of from 10° to 30°, in particular to 20°. In particular, the sealing edge may limit a movement of the deflection stop.

The pressure system may in particular be connectable to the cavity which can be closed off air-tightly. For example, the pressure system may be connected directly or indirectly to the cavity which can be closed off air-tightly.

In one exemplary embodiment, the magnetizable ball may be movably mounted such that it can make contact with the magnetic element at at least one point. In particular, the ball may make contact with the magnetic element at a distinct point at which it, in a rolling movement, strikes the magnetic element.

As already mentioned, the magnetic element may in particular be selected from a permanent magnet or an electromagnet. The permanent magnet may in this case typically comprise a magnetically hard material, for example an alloy composed of iron, cobalt, nickel, or ferrites. In particular, the permanent magnet may have a magnetic field, for example a static magnetic field, without the need for a flow of electrical current. Alternatively, the magnetic element may also be an electromagnet. For example, the electromagnet may comprise at least one coil in which a magnetic field forms when a current flows through.

As already mentioned, the magnetic element may be configured in particular as a magnetic disc or as a spherical calotte. The magnetic disc may typically have at least two surfaces configured to be parallel, typically at least two surfaces which are of circular or ring-shaped design and arranged parallel to one another. Alternatively, the magnetic element may be configured as a spherical calotte. For example, the spherical calotte may be adapted to a surface of the suction calotte facing towards the counterpart, or to the ball, or to a surface of the counterpart facing towards the suction calotte. The spherical calotte may typically be adapted to the surface of the suction calotte facing towards the counterpart, or to the ball, or to the surface of the counterpart facing towards the suction calotte, to form a common surface, for example a calotte-shaped surface, with the surface of the suction calotte or with the surface of the counterpart.

A ball receptacle for receiving the ball may typically be provided. In particular, the ball receptacle may be configured for the permanent movable mounting of the ball. The ball receptacle may typically furthermore be configured such that a rotational movement of the ball can be performed. In particular, a rotational movement of the ball within the ball receptacle may be capable of being performed, in particular may be made possible. Furthermore, the ball receptacle may be configured such that a limited translational movement of the ball in at least one direction can be performed. Typically, the ball receptacle may be configured to permit the translational movement of the ball perpendicular to the surface of the suction calotte facing towards the counterpart. Furthermore, the pressure system may be connectable to the ball receptacle. The pressure system may typically be connectable to the ball receptacle to enable the pressure, in particular the force per unit of area, to be guided into the ball receptacle, typically through the ball receptacle.

The housing may in particular have a housing cover. For example, the housing cover may be configured such that the ball can be introduced into the counterpart configured as a housing. For this purpose, the housing cover may be configured in order to enable the ball to be introduced into a ball receptacle arranged typically in the counterpart.

In one exemplary embodiment, the pressure system may have at least one connection to an external system for the provision and/or withdrawal of a pressure fluid, for example of compressed air, wherein the connection may for example be led through the housing, in particular through the housing cover.

In one exemplary embodiment, the suction gripper system may furthermore have at least one compensating element. The compensating element may in this case be configured in particular to compensate different dimensions of different articles to be handled.

In another exemplary embodiment, the suction gripper system may have a parting line, for example a parting point, in particular a natural parting point, which may run between the ball and the magnetic element. The parting line may be used for example as a parting point for a repair or an exchange process, in particular may serve as a parting point for a tool change, such as an exchange of a suction attachment, typically for an exchange of the suction calotte. Here, it is typically possible, by an action of force in the form of a negative pressure (pulling action), for the magnetic force that prevails between the ball and the magnetic element in the rest state to be overcome, and thus for the suction calotte to be separated from the counterpart. The suction calotte can thereupon be cleaned and/or replaced and subsequently reused. Alternatively or in addition, a contaminated and/or damaged suction calotte can be easily and quickly exchanged for another suction calotte. In a further embodiment, a suction calotte in use may be replaced with another suction calotte which may in particular have a deviating form and which can thus better adapt to the form and/or the position of the article to be handled.

In a further aspect, the present disclosure relates to a method for handling at least one article. The method comprises the following steps, typically in the stated sequence. Another sequence is also possible in principle. In particular, it is also possible for the method steps to be performed entirely or partially at the same time. It is furthermore possible for individual, multiple or all steps of the method to be performed repeatedly, in particular more than once. In addition to the stated method steps, the method may also comprise further method steps.

The method steps of the method for handling at least one article are:
a) providing a suction gripper system in an initial state;
b) positioning the suction gripper system in relation to the article to be handled;
c) generating a negative pressure for the handling of the article;
d) releasing the negative pressure in order to end the handling of the article; and
e) returning the suction gripper system into the initial state through a magnetic interaction of the ball and of the magnetic element.

The provision of the suction gripper system in an initial state in method step a) involves in particular a suction gripper system that has been described in more detail elsewhere in this disclosure. Accordingly, for definitions and optional exemplary embodiments, reference may substantially be made to the description of the suction gripper system.

In method step b), the suction calotte for this purpose adapts its position and/or form at least partially to the form and/or position of the article such that the desired handling of the article can be performed using the negative pressure.

By the generation of the negative pressure in method step c), the suction calotte is fixed relative to the counterpart. In particular, spatial fixing of the suction calotte relative to the counterpart can be achieved for example by suctioning of the suction calotte onto the counterpart owing to the generation of the negative pressure. By generating the negative pressure, it is thus possible for the magnetic interaction, for example the interacting force, between the ball and the magnetic element to be overcome. Furthermore, by generating the negative pressure, the article can be fixed relative to the suction calotte and consequently picked up by the suction calotte.

In method step d), the handling of the article is ended by the release of the negative pressure. In particular, the release of the negative pressure may typically be performed by aeration of the suction gripper system with a pressure system provided for the same. Alternatively, the release of the negative pressure may also be performed by application of pressure to the pressure system, for example with a slight positive pressure.

In method step e), the suction gripper system is returned into the initial state by the magnetic interaction of the ball and of the magnetic element. The suction gripper system may typically be returned into a starting state, which is defined for example by a relative position of the suction calotte and of the counterpart with respect to one another and in which the suction gripper system is situated in step a), typically at the start of the method. The initial state is typically an equilibrium position, in particular an equilibrium position with respect to the forces acting owing to the magnetic interaction, such as an equilibrium relative position of the suction calotte and of the counterpart with respect to one another, such that the force acting owing to the magnetic interaction between the ball and the magnetic element can assume a minimum. It is particularly typical if, in the initial state, the ball is in equilibrium with respect to the magnetic element, and the ball is in this case typically arranged in a centered manner in relation to the magnetic element, for example in the middle of the magnetic element.

In a further aspect, the present disclosure relates to a method for producing at least one spectacle lens. The method comprises handling the spectacle lens at least during the production of the spectacle lens with a suction gripper system and/or with a method for handling at least one article, as described in more detail elsewhere in this disclosure. Accordingly, for definitions and optional exemplary embodiments, reference may substantially be made to the description of the suction gripper system and of the method for handling at least one article.

In the context of the present disclosure, a "spectacle lens" is to be understood basically to mean any element that is configured to influence electromagnetic waves in the range of the visible spectral range or adjacent spectral ranges, to alter, in particular improve, the vision of a human or animal eye. For this purpose, a spectacle lens may be configured typically as a refractive optical lens or as a lens system. The spectacle lens may typically have an optically transparent material, selected in particular from glass, quartz, or a transparent organic plastic.

For further details in relation to the present methods, reference is made to the rest of the description of the suction gripper system and of the method for handling at least one article.

In a further aspect, the present disclosure relates to a use of a suction gripper system for handling at least one article, wherein the article is or comprises an optical element. The suction gripper system involves in particular a suction gripper system that has been described in more detail elsewhere in this disclosure. Accordingly, for definitions and optional exemplary embodiments, reference may substantially be made to the description of the suction gripper system.

In the context of the present disclosure, an "optical element" is to be understood basically to mean any element which is configured to influence electromagnetic waves in the range of the visible spectral range or adjacent spectral ranges. These include in particular refractive or non-refractive optical elements such as lenses or lens systems, typically spectacle lenses, or prisms. Other optical elements are however possible. Since such optical elements generally are made of an optically transparent material, selected in particular from glass, quartz, or a transparent organic plastic, gentle treatment of the optical element and in particular of its surface is particularly advantageous. By a gentle treatment is to be understood an action with the lowest possible forces and friction on the optical element by a device for handling the optical element, for which the suction gripper system proposed here is particularly suitable. What are typically suitable for the suction gripper system are optical elements which, in particular in a manner dependent on a spatial extent of the suction gripper system, in particular of the suction calotte, have a size from 1 cm to 1 m, typically of 2 cm to 50 cm.

The suction gripper system according to the disclosure, which can also be referred to as "wobble-action suction cup," the present methods and the use have numerous advantages in relation to conventional devices, methods, and uses. In particular, it is for example possible for an expenditure of force that is applied during a setting-down of the suction gripper system onto the article to be reduced in relation to devices known from the related art. For this reason, it may be possible for the suction gripper system according to the disclosure and the present method, by contrast to conventional devices and methods, to be suitable for handling articles with a relatively sensitive surface. In particular, the suction gripper system according to the disclosure and the proposed methods may for example be distinguished by a lower action of force on the article to be handled than conventional devices and methods. For example, it may be possible that, in the case of the proposed suction gripper system and the methods, a holding force of the magnetic element does not give rise to any friction between counterpart and suction calotte, whereby the force required for handling the article, in particular the force required for positioning, is reduced in relation to conventional devices and methods.

By contrast to devices, methods, and uses known from the related art, the suction gripper system according to the disclosure and the present methods can permit an automatic return into an initial position. In particular, in this way, it is for example possible to omit an intermediate step in the methods, typically an intermediate step which comprises the return into the initial position. In particular, it is possible to omit an intermediate step of the return into the initial position with elements configured specifically for the purpose.

Furthermore, the suction gripper system proposed here and the proposed methods may exhibit easier handling, in particular a smoother or lower-friction movement, in relation to conventional devices, methods, and uses. In particular, friction forces can be minimized by a punctiform abutment of the ball against the magnetic element. In particular, the suction gripper system proposed here and the methods may exhibit smooth rolling of the ball on the surface of the magnetic element. This may for example be made possible by virtue of the ball, for example similarly to that in a ball bearing, being typically rotationally freely movable and being movable in translation in one direction, in particular in a vertical direction, for example in a z-direction, in the ball receptacle, and being capable of being held for example similarly to being in a cage. In particular, the degree of freedom in a z-direction could in this case for example compensate any occurring system-induced tolerances, for example tolerances that may arise as a result of an occurring deviation of a flat disc with respect to a ball section.

Furthermore, the suction gripper system according to the disclosure, the present methods and the proposed use may exhibit an improvement with regard to repairs and exchange processes in relation to conventional devices, methods, and uses. In particular, the suction gripper system may be held together by the magnetic interaction, for example by magnetic forces, between the ball and the magnetic element. It would typically be possible for a parting line, for example a parting point, such as a natural parting point, to run between the ball and the magnetic element. The parting line may be used for example as a parting point for a repair or an exchange process, and in particular, the parting line may serve as a parting point for a tool change, for example for an exchange of a suction attachment, typically for an exchange of the suction calotte.

In particular, the suction gripper system according to the disclosure, the present methods and the proposed use may permit more reliable centering, in particular a more reliable return into the initial state, and thus more reliable handling of the article in relation to devices, methods, and uses known from the related art. For example, lower friction during a centering process may be attained in particular owing to the punctiform abutment of the ball, in particular of the steel ball, against the magnetic element, such as against the magnetic disc. It may in particular be the case that only rolling friction exists between the ball and the magnetic element. In particular, the steel ball may be attracted by magnetic field lines of the magnetic disc. For example, the magnetic field lines may have a high density, in particular the highest density, in the middle of the magnetic disc, in particular in the middle of the respective poles of the magnetic disc. In particular, the ball may for example be attracted with the greatest intensity by the high density of the magnetic field lines in the middle of the magnetic disc. It is consequently possible for the ball, for example the steel ball, owing to the low friction between ball and magnetic element, to be centered in the middle of the magnetic disc by the high density of the magnetic field lines, and it is possible in particular for the suction gripper system to be returned into its initial state in this way. Furthermore, with the suction gripper system according to the disclosure, it can be ensured that the ball, for example a meridian of the ball, is not pushed, for example displaced, beyond a margin of the magnetic element, in particular beyond an edge of the magnetic disc. In this way, it would for example be possible for the ball to be prevented from passing into condensed field lines at the edge of the magnetic disc, for example by the deflection stop.

In summary, the following exemplary embodiments are particularly typical in the context of the present disclosure:

Exemplary Embodiment 1

A suction gripper system for the handling of at least one article, wherein the suction gripper system comprises a suction calotte for the handling of the at least one article and comprises a counterpart which is configured correspondingly to the suction calotte, wherein a magnetic element is furthermore provided, wherein a movably mounted magnetizable ball is furthermore provided, wherein the ball and the magnetic element are arranged in magnetically interactable fashion with respect to one another in order to influence a spatial position of the suction calotte in relation to the counterpart.

Exemplary Embodiment 2

A suction gripper system according to the preceding exemplary embodiment, wherein the counterpart is configured for receiving a first element, wherein the first element is selected from the movably mounted magnetizable ball and the magnetic element, wherein the suction calotte is configured for receiving a second element which differs from the first element, wherein the second element is selected from the ball and the magnetic element.

Exemplary Embodiment 3

A suction gripper system according to either of the preceding exemplary embodiments, wherein the suction calotte comprises a suction attachment which is configured to adapt to a part of a surface of the article.

Exemplary Embodiment 4

A suction gripper system according to the preceding exemplary embodiment, wherein the suction attachment is configured to close off the part of the surface of the article air-tightly.

Exemplary Embodiment 5

A suction gripper system according to any of the preceding exemplary embodiments, furthermore comprising at least one pressure system for applying pressure, typically negative pressure, to the suction calotte.

Exemplary Embodiment 6

A suction gripper system according to any of the preceding exemplary embodiments, wherein the counterpart and the suction calotte are configured to form a cavity, which can be closed off air-tightly, between the counterpart and the suction calotte.

Exemplary Embodiment 7

A suction gripper system according to the preceding exemplary embodiment, wherein the cavity which can be closed off air-tightly can be formed by virtue of a region of the surface of the suction calotte and a sealing edge comprised by the counterpart being joined together.

Exemplary Embodiment 8

A suction gripper system according to the preceding exemplary embodiment, wherein the suction calotte has a deflection stop which is fixedly connected thereto and with which a relative movement of the suction calotte with respect to the counterpart can be restricted, wherein the sealing edge limits a movement of the deflection stop.

Exemplary Embodiment 9

A suction gripper system according to any of the three preceding exemplary embodiments, wherein the pressure system is connectable to the cavity which can be closed off air-tightly.

Exemplary Embodiment 10

A suction gripper system according to any of the preceding exemplary embodiments, wherein the ball makes contact with the magnetic element at least at one point.

Exemplary Embodiment 11

A suction gripper system according to any of the preceding exemplary embodiments, wherein the magnetic element is selected from a permanent magnet and an electromagnet.

Exemplary Embodiment 12

A suction gripper system according to any of the preceding exemplary embodiments, wherein the magnetic element is configured as a magnetic disc or as a spherical calotte.

Exemplary Embodiment 13

A suction gripper system according to the preceding exemplary embodiment, wherein the spherical calotte is adapted to the ball, to a surface of the suction calotte facing towards the counterpart, or to a surface of the counterpart facing towards the suction calotte.

Exemplary Embodiment 14

A suction gripper system according to any of the preceding exemplary embodiments, wherein a ball receptacle for receiving the ball is provided, wherein the ball receptacle is configured for the permanent movable mounting of the ball.

Exemplary Embodiment 15

A suction gripper system according to the preceding exemplary embodiment, wherein the ball receptacle is furthermore configured such that a rotational movement of the ball can be performed.

Exemplary Embodiment 16

A suction gripper system according to either of the two preceding exemplary embodiments, wherein the ball receptacle is furthermore configured such that a limited translational movement of the ball in at least one direction can be performed.

Exemplary Embodiment 17

A suction gripper system according to any of the three preceding exemplary embodiments, wherein the pressure system is connectable to the ball receptacle.

Exemplary Embodiment 18

A suction gripper system according to any of the preceding exemplary embodiments, wherein the counterpart configured as a housing has a housing cover, wherein the housing cover is configured such that the ball can be introduced into the counterpart.

Exemplary Embodiment 19

A suction gripper system according to the preceding exemplary embodiment, wherein the pressure system has at least one connection which may be led through the housing, in particular through the housing cover.

Exemplary Embodiment 20

A suction gripper system according to any of the preceding exemplary embodiments, wherein the suction gripper system furthermore has at least one compensating element, wherein the compensating element is configured to compensate different dimensions of different articles to be handled.

Exemplary Embodiment 21

A method for handling at least one article, comprising the following steps:
a) providing a suction gripper system, wherein the suction gripper system comprises a suction calotte for the handling of the at least one article and comprises a counterpart which is configured correspondingly to the suction calotte, wherein a magnetic element is furthermore provided;
b) positioning the suction gripper system in relation to the article to be handled;
c) generating a negative pressure for the handling of the article;
d) releasing the negative pressure in order to end the handling of the article; and
e) returning the suction gripper system into the initial state through a magnetic interaction of the ball and of the magnetic element,
wherein in the suction gripper system, a movably mounted magnetizable ball is furthermore provided, wherein the ball and the magnetic element are arranged in magnetically interactable fashion with respect to one another such that, as a result, a spatial position of the suction calotte in relation to the counterpart is influenced at least during one of the steps b) or e).

Exemplary Embodiment 22

A method according to the preceding exemplary embodiment, wherein, by the generation of the negative pressure, the suction calotte is fixed relative to the counterpart.

Exemplary Embodiment 23

A method according to the preceding exemplary embodiment, wherein the fixing of the suction calotte relative to the counterpart is realized by suctioning of the suction calotte onto the counterpart and/or by virtue of the magnetic interaction of the ball and of the magnetic element being overcome.

Exemplary Embodiment 24

A method for producing at least one spectacle lens, wherein handling of the spectacle lens at least during the production of the spectacle lens is performed with a suction gripper system, wherein the suction gripper system comprises a suction calotte for the handling of the at least one article and comprises a counterpart which is configured correspondingly to the suction calotte, wherein a magnetic element is furthermore provided, wherein a movably mounted magnetizable ball is furthermore provided, wherein the ball and the magnetic element are arranged in magnetically interactable fashion with respect to one another in order to influence a spatial position of the suction calotte in relation to the counterpart.

Exemplary Embodiment 25

A use of a suction gripper system for the handling of at least one article, wherein the article is or comprises an optical element, wherein the suction gripper system comprises a suction calotte for the handling of the at least one article and comprises a counterpart which is configured correspondingly to the suction calotte, wherein a magnetic element is furthermore provided, wherein a movably mounted magnetizable ball is furthermore provided, wherein the ball and the magnetic element are arranged in magnetically interactable fashion with respect to one another in order to influence a spatial position of the suction calotte in relation to the counterpart.

Exemplary Embodiment 26

A use according to the preceding exemplary embodiment, wherein the optical element comprises at least a lens, a lens system, and/or a prism.

Exemplary Embodiment 27

A use according to the preceding exemplary embodiment, wherein the optical element comprises a spectacle lens.

BRIEF DESCRIPTION OF THE DRAWINGS

The disclosure will now be described with reference to the drawings wherein.

DESCRIPTION OF EXEMPLARY EMBODIMENTS

Figure 1A:
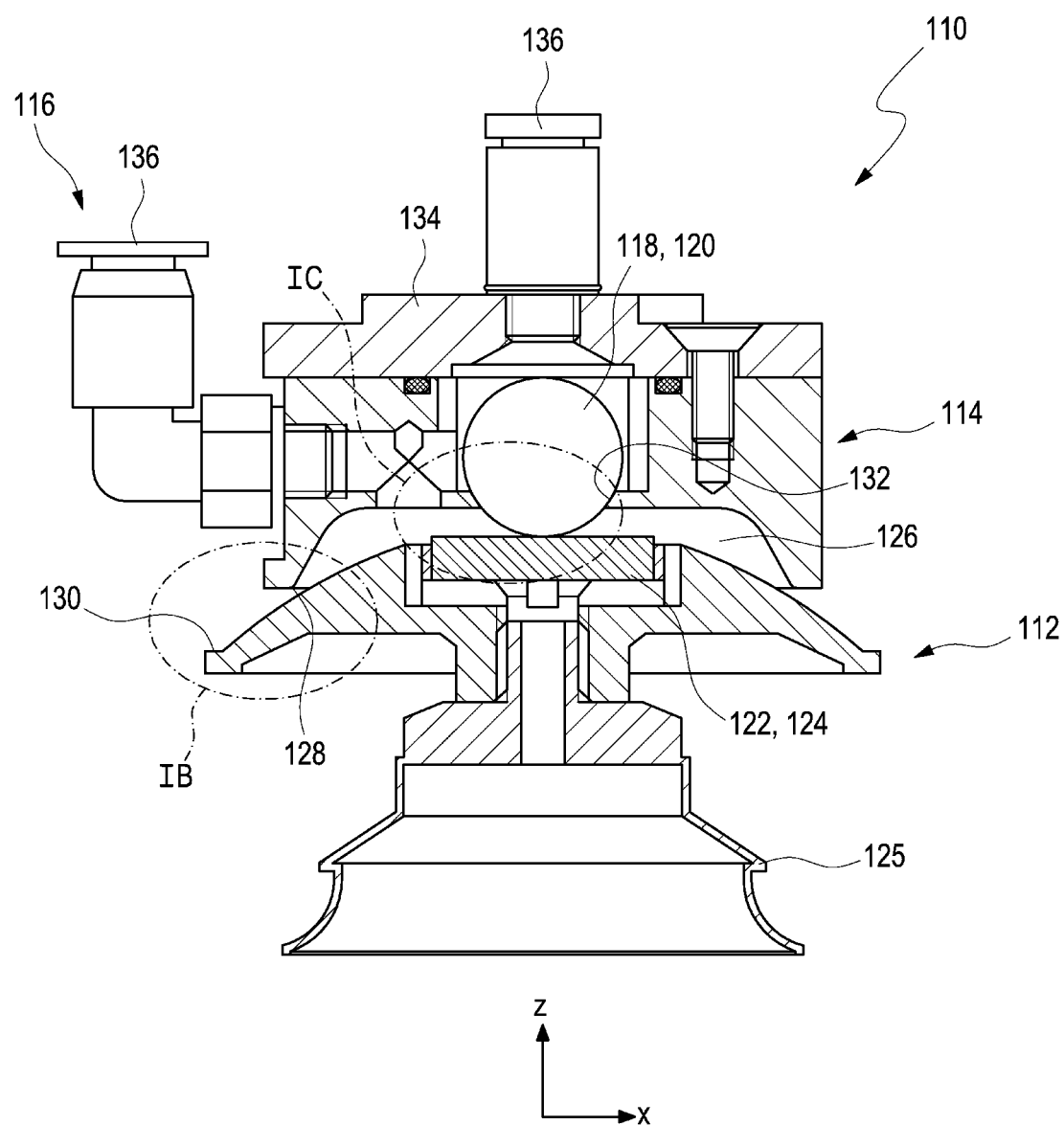
FIG. 1A is a sectional illustration of an exemplary embodiment of a suction gripper system.

Further details and features of the disclosure will become apparent from the following description of preferred exemplary embodiments. The respective features can be realized by themselves or as a plurality in combination with one another. The disclosure is not restricted to the exemplary embodiments. The exemplary embodiments are illustrated schematically in the figures. In this case, identical reference numerals in the individual figures designate identical or functionally identical elements or elements corresponding to one another with regard to their functions.

FIG. 1A shows an exemplary embodiment of a suction gripper system 110 for handling at least one article (not shown) in a sectional illustration. The suction gripper system 110 comprises a suction calotte 112 for the handling of the at least one article with pressure and comprises a counterpart 114 configured correspondingly to the suction calotte 112. In particular for the application of pressure, typically negative pressure, to the suction calotte 112, the suction gripper system 110 may comprise at least one pressure system 116. In particular, it is furthermore possible for a magnetic element 124 and a movably mounted magnetizable ball 120 to be provided. Here, the ball 120 and the magnetic element 124 are arranged in magnetically interactable fashion with respect to one another in order to influence a spatial position of the suction calotte 112 in relation to the counterpart 114. The counterpart 114 may in this case be configured in particular for receiving a first element 118, wherein, in the exemplary embodiment illustrated here, the first element 118 is the movably mounted magnetizable ball 120. Furthermore, the suction calotte 112 is configured for receiving a second element 122 which differs from the first element 118, wherein, in the exemplary embodiment illustrated here, the second element 122 is the magnetic element 124.

Figure 1B:
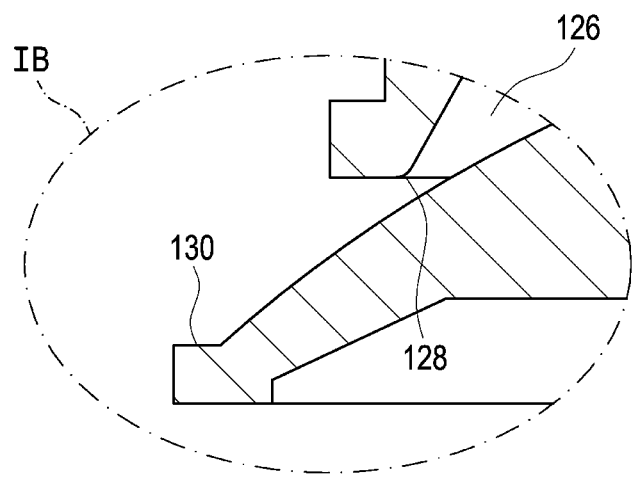
FIGS. 1B and 1C show details of the exemplary embodiment of the suction gripper system illustrated in FIG. 1A.

In the exemplary embodiment shown in FIG. 1A, the suction calotte 112 comprises a suction attachment 125 which is configured to adapt to a part of a surface of the article. Furthermore, the suction attachment 125 may be configured to close off the part of the surface of the article air-tightly. The suction attachment 125 may typically close off the part of the surface of the article air-tightly exactly when the suction calotte 112 has had the negative pressure applied thereto. In particular, the counterpart 114 and the suction calotte 112 may be configured to form a cavity 126, which can be closed off air-tightly, between the counterpart 114 and the suction calotte 112. The pressure system 116 may typically be connectable to the cavity 126 which can be closed off air-tightly. Typically, the cavity 126 which can be closed off air-tightly may be capable of being formed by virtue of a region of the surface of the suction calotte 112 and a sealing edge 128 comprised by the counterpart 114 being joined together. The sealing edge 128 shown in inset IB can be seen illustrated in detail in FIG. 1B of the suction gripper system illustrated in FIG. 1A. FIGS. 1A and 1B furthermore show a deflection stop 130 which is fixedly connected to the suction calotte 112. In particular, it may typically be possible for a relative movement of the suction calotte 112 with respect to the counterpart 114 to be restricted by the deflection stop 130. Typically, a movement of the deflection stop 130 may be limited by the sealing edge 128.

Figure 1C:
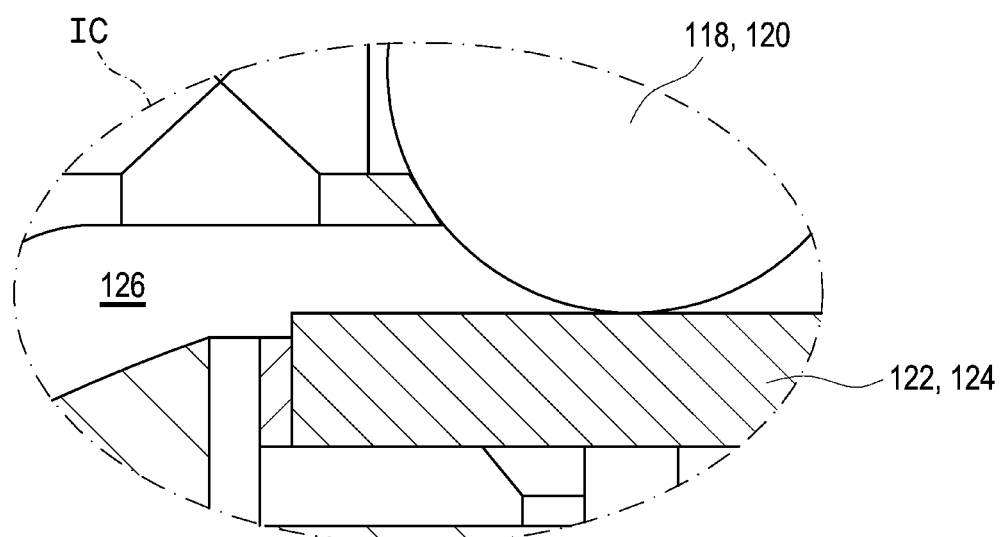

The ball 120 and the magnetic element 124 may typically be arranged such that the ball 120 makes contact with the magnetic element 124 at least one point. This punctiform contact shown in inset IC can be seen illustrated in the detail in FIG. 1C of the suction gripper system illustrated in FIG. 1A.

Furthermore, FIG. 1A illustrates a ball receptacle 132 which may be configured for the permanent movable mounting of the ball 120. The ball receptacle 132 may furthermore be configured such that a rotational movement of the ball 120 can be performed. Furthermore, the ball receptacle 132 may be configured such that a limited translational movement of the ball 120 in at least one direction can be performed. For example, in particular, a limited translational movement of the ball 120 in a z-direction may be performed, in particular in the direction of the z axis of the coordinate system illustrated in FIG. 1A. Typically, the pressure system 116 may furthermore be connectable to the ball receptacle.

As is likewise illustrated in FIG. 1A, the counterpart 114 may be configured as a housing and may typically have a housing cover 134. The housing cover 134 may in particular be configured such that the ball 120 can be introduced from the outside into the counterpart 114.

Furthermore, the pressure system 116 may have at least one connection 136. As shown in FIG. 1A, the pressure system may typically have two connections 136. Here, the connection 136 may in particular be capable of being led through the housing, typically through the housing cover 134.

Figure 2:
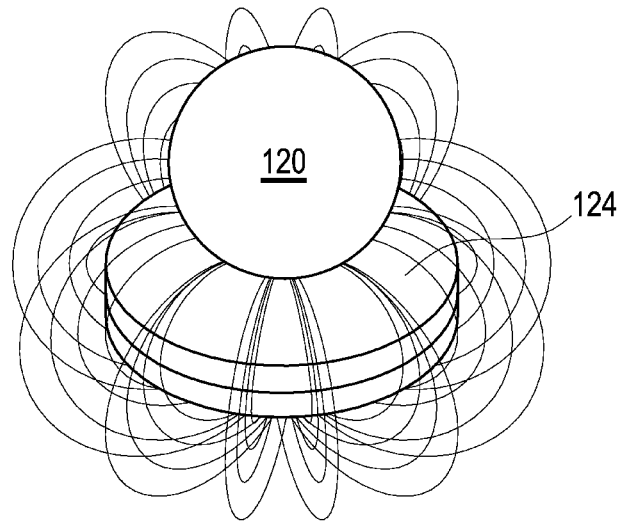
FIG. 2 is a perspective illustration of a detail of an exemplary embodiment of a suction gripper system.

FIG. 2 shows a detail of an exemplary embodiment of a suction gripper system, wherein a magnetic element 124 configured as a permanent magnet, in particular a permanent magnet with north pole and south pole, and the magnetic field lines thereof are illustrated. In particular, the magnetic field lines may have a high density in the middle of the magnetic element 124, in particular in the middle of the poles of the permanent magnet, as illustrated in FIG. 2. In particular, the ball 120 which is likewise illustrated may be attracted with the greatest intensity by the high density of the magnetic field lines in the middle of the magnetic element 124. Typically, the exemplary embodiment illustrated here may show a relative position of the ball 120 with respect to the magnetic element 124 assumed by the ball 120 and the magnetic element 124 in an initial state of the suction gripper system.

Figure 3:
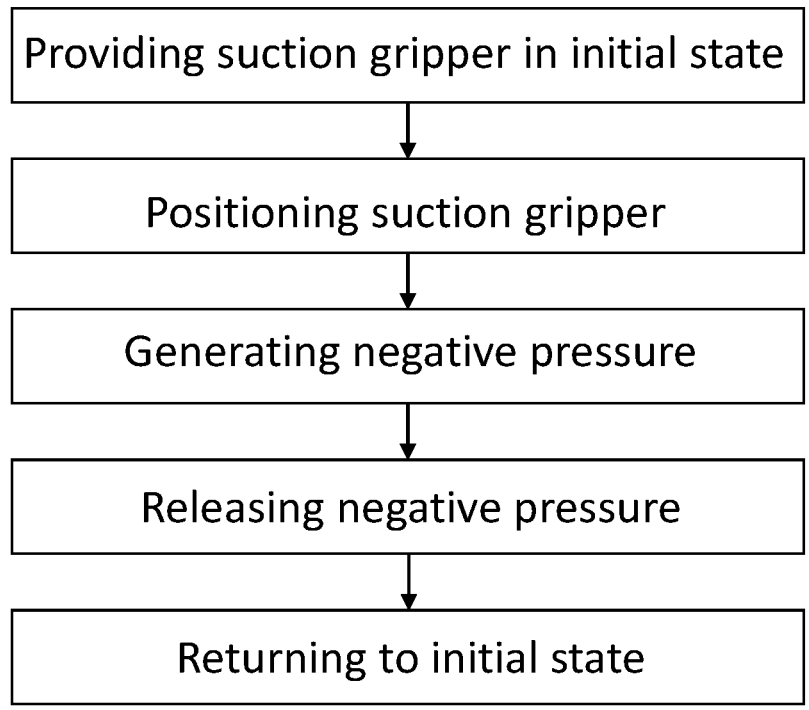
FIG. 3 shows a flow diagram of an exemplary embodiment of a method for handling at least one article.

FIG. 3 illustrates a flow diagram of an exemplary embodiment of a method for handling at least one article. The method comprises multiple steps, typically in the sequence illustrated in the flow diagram. Another sequence is however also possible in principle. In particular, it is also possible for the method steps to be performed entirely or partially at the same time. It is furthermore possible for individual, multiple or all steps of the flow diagram, illustrated here, of the exemplary embodiment of the method to be performed repeatedly, in particular more than once. In addition to the illustrated method steps, the method may also comprise further method steps that are not illustrated here.

In particular, the method illustrated in FIG. 3 comprises a method step 138 which, as per step a), comprises a provision of the suction gripper system 110 in an initial state. In particular, the suction gripper system 110 illustrated in FIG. 1A may be situated in the initial state in which the suction gripper system 110 is provided in the method step 138. Typically, a ball 120 and a magnetic element 124 may be received in the suction gripper system 110 in the initial state, wherein the ball 120 and the magnetic element 124 may typically be arranged in a relative position illustrated in FIG. 2. For example, the ball 120 may be received in the ball receptacle 132, and the magnetic element 124 may be attracted to and centered on the ball 120, and in particular, the ball 120 and the magnetic element 124 may be in contact and situated in a state of equilibrium. Furthermore, the initial state of the suction gripper system 110 may for example be distinguished by the fact that a provided pressure system 116 does not have a pressure applied thereto, but rather exhibits for example an ambient pressure. It is typical for the pressure, in particular the negative pressure, for example a vacuum, particularly typically a pressure which deviates from the ambient pressure, within the pressure system 116 to be deactivated in the initial state of the suction gripper system 110.

Figure 4A:
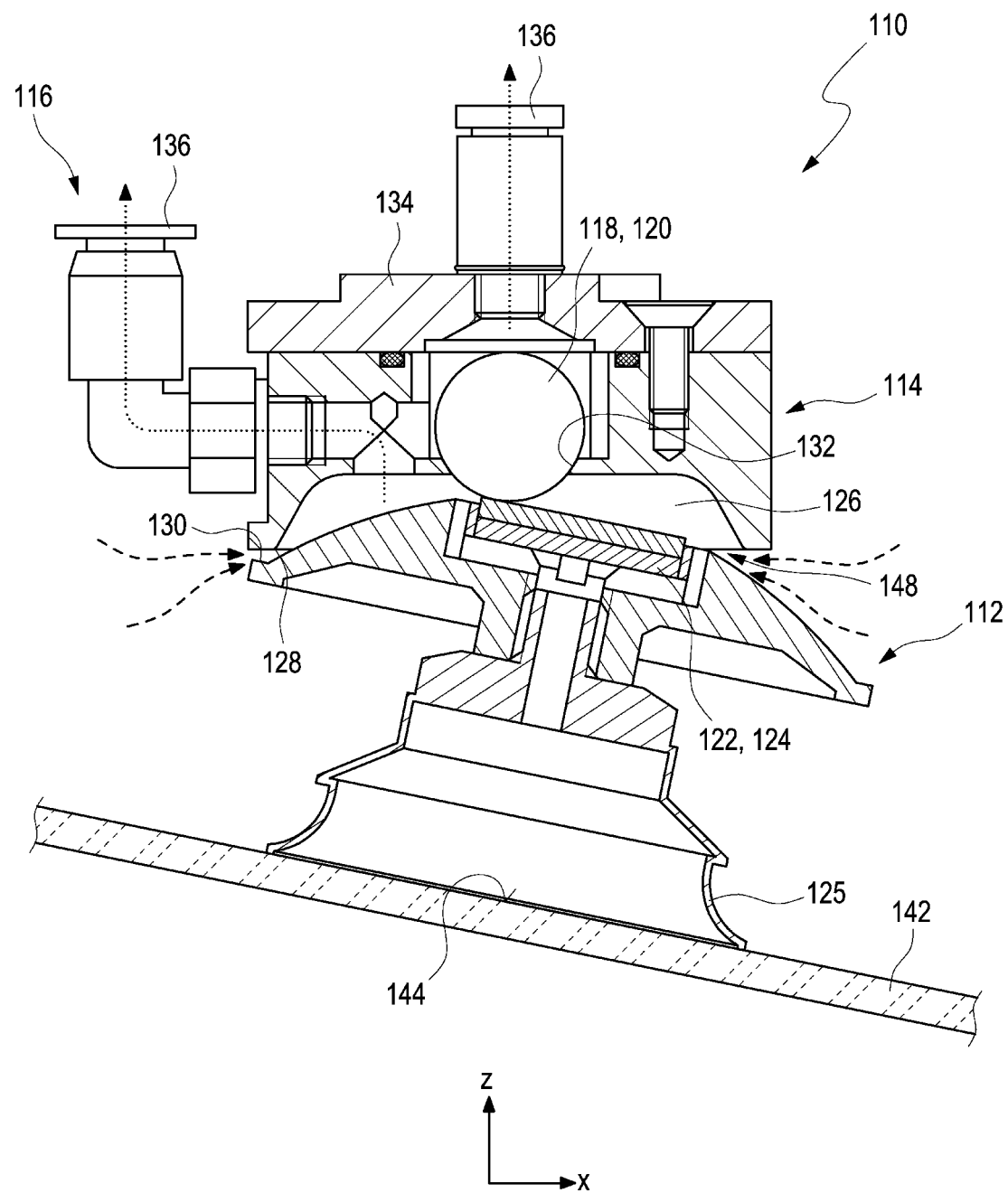
FIGS. 4A to 4C show intermediate steps of an exemplary embodiment of a method for handling at least one article.

The method illustrated in FIG. 3 furthermore comprises a method step 140, which, as per step b), comprises a positioning of the suction gripper system 110 relative to the article 142 to be handled. The suction gripper system 110 may typically be fastened to and/or guided on a handling unit (not illustrated here), for example a portal, in particular a portal crane, a robot, for example an arm of the robot, or a similar device. In particular, the suction gripper system 110 may be positioned relative to the article 142 illustrated in FIG. 4A, for example a lens, typically a spectacle lens, more typically a spectacle lens with corresponding prism. Here, the suction calotte 112 of the suction gripper system 110 may typically move, for example perform a relative movement, relative to the counterpart 114. The suction calotte 112 may typically move relative to the counterpart 114, in particular move in pendular fashion, for example move in pendular fashion relative to the counterpart 114 on a spherical path in order to adapt in relation to the article 142. Here, as illustrated in FIG. 4A, the article 142 may typically be arranged obliquely with respect to the suction gripper system 110. Here, in particular, the suction attachment 125 may, as illustrated in FIG. 4A, adapt to a part of a surface 144 of the article 142.

Furthermore, the method illustrated in FIG. 3 comprises a method step 146 which, as per step c), comprises a generation of a negative pressure for the handling of the article 142. Here, the pressure system 116 may typically have a negative pressure, for example a vacuum, applied thereto. In particular, a fluid that may be present, for example air, may be suctioned out through the at least one connection 136, typically through two connections 136, as illustrated for example by the arrows leading through the connections 136 in FIG. 4A. Here, for example, air may flow in through a gap, typically through a ring-shaped gap 148, for example through an annular gap, between the counterpart 114 and the suction calotte 112, typically between the sealing edge 128 and a region of the surface of the suction calotte 112. In particular, the air may typically flow in through the gap 148 in the direction of the arrows illustrated by dashed lines in FIG. 4A, for example into a cavity 126 which can be closed off air-tightly.

Figure 4B:
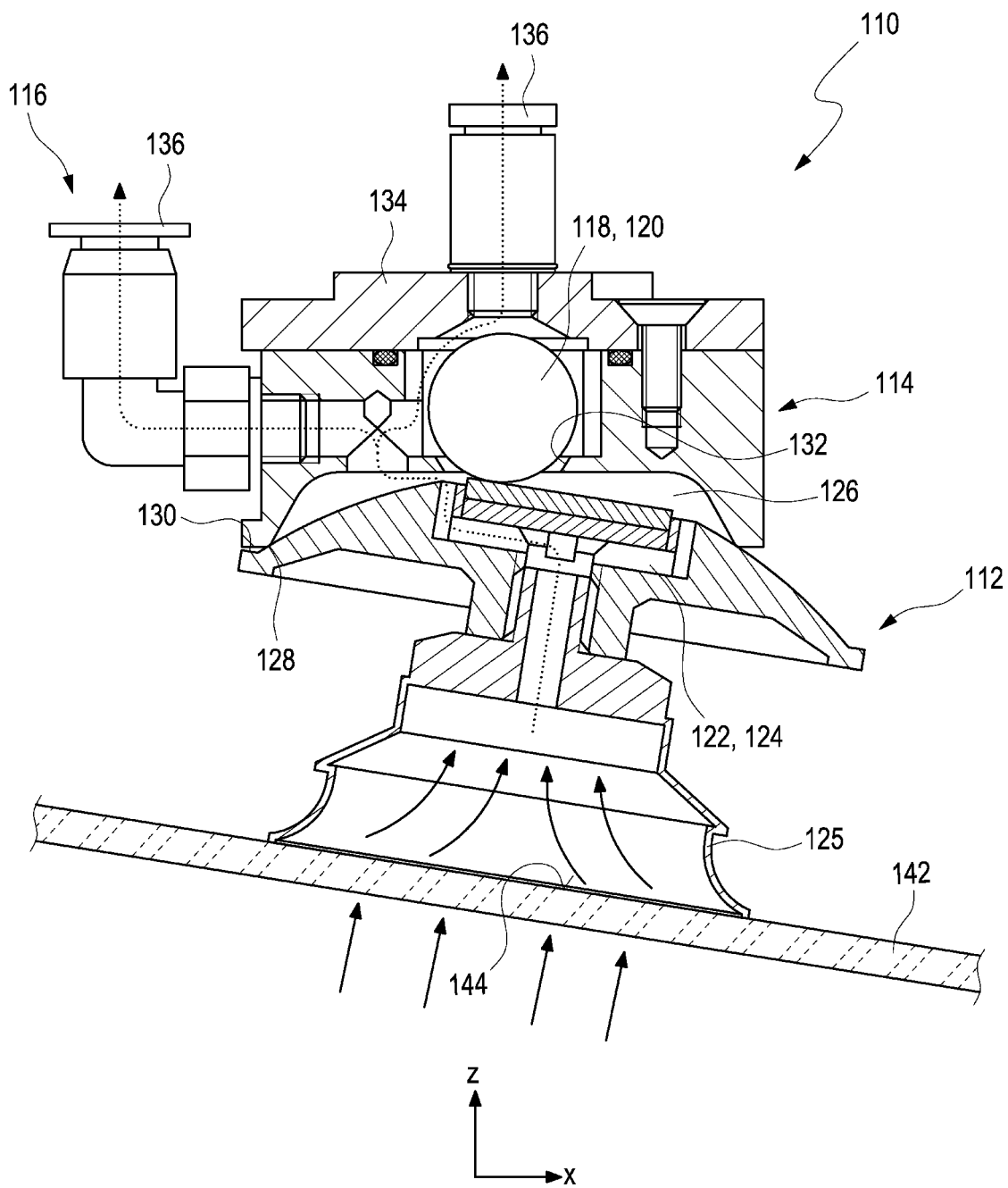

By reduction of the gap 148, in particular owing to further suction extraction of the air and/or by virtue of the region of the surface of the suction calotte 112 and the sealing edge 128 being joined together, the inflow of the air through the gap 148, in particular through the annular gap, is stopped, as illustrated for example, in FIG. 4B. In this way, it is for example possible for the cavity 126 which can be closed off air-tightly to be closed off air-tightly. In particular, friction, typically a force arising from friction, in particular a friction force, may act between the surface of the suction calotte 112 and the sealing edge 128. Owing to the friction force, it is for example possible for the suction calotte 112 to be fixed relative to the counterpart 114. In particular, the friction force may counteract a force, for example a magnetic force, acting owing to the magnetic interaction between the ball 120 and the magnetic element 124. The friction force may typically overcome the magnetic force, and in particular, the friction force may be greater than the magnetic force.

As illustrated in FIG. 4B, the suction attachment 125 may furthermore be adapted to the part of the surface 144 of the article 142. In particular, the suction attachment 125 may be configured to close off the part of the surface 144 of the article 142 air-tightly. Typically, the article 142 can be suctioned on by further suction extraction of the air through the at least one connection 136, as illustrated for example by the arrows leading through the connections 136 in FIG. 4B. For example, an action of a force along the solid arrows in FIG. 4B may be attained, which fixes the article 142 relative to the suction gripper system 110. In particular, in this way, the article 142 can be moved, for example transported, together with the suction gripper system 110. In particular, the article 142, for example the lens, typically the spectacle lens, can be transported, for example lifted, without changing its position relative to the suction gripper system 110. In this way, it is for example possible to achieve handling, typically positionally accurate handling, particularly typically highly precise and smooth handling, of the article 142.

Figure 4C:
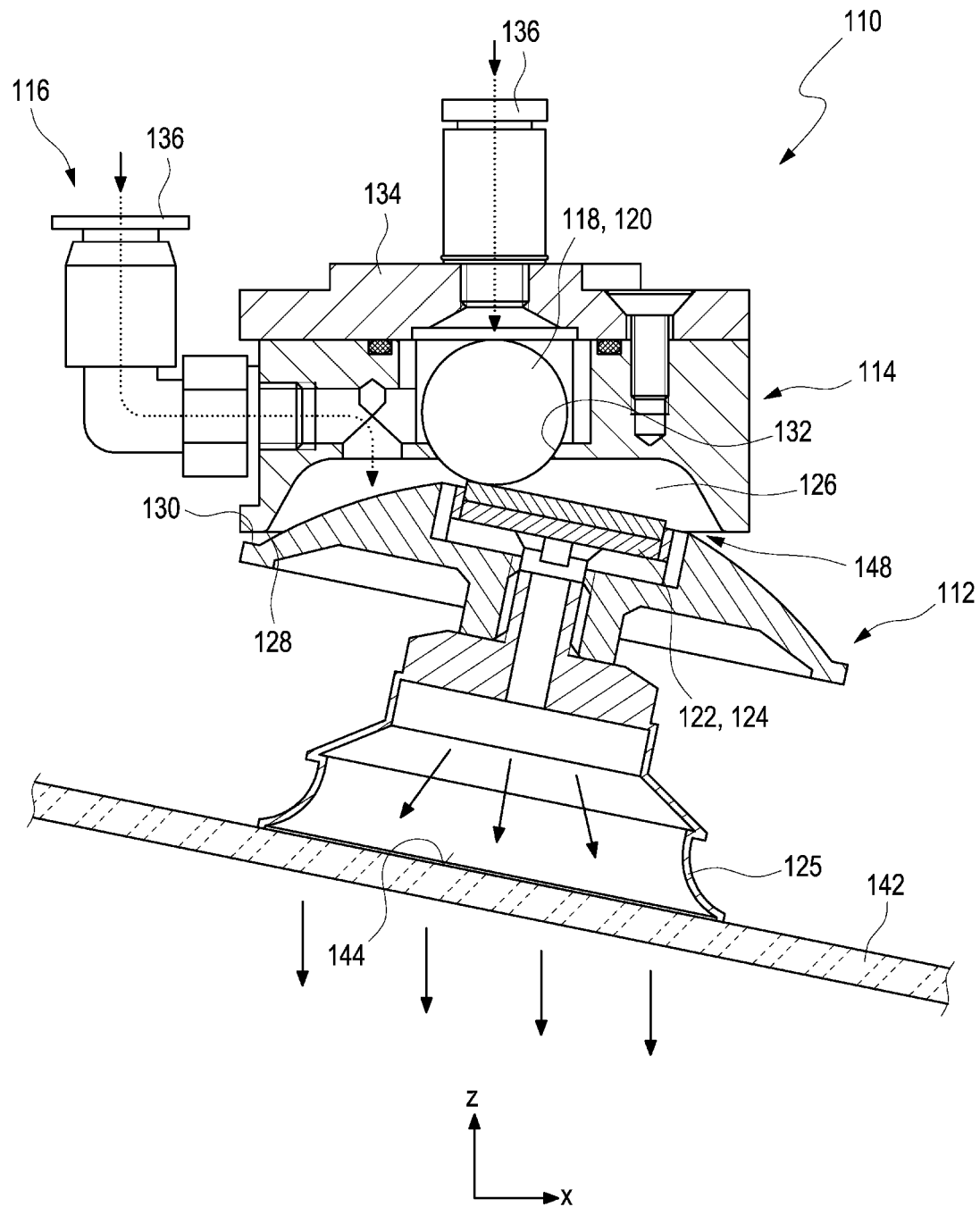

Furthermore, the method illustrated in FIG. 3 comprises a method step 150 which, as per step d), comprises a release of the negative pressure in order to end the handling of the article 142. In particular, in order to end the handling of the article 142, the negative pressure may be released, in particular reduced or withdrawn entirely, as illustrated for example in FIG. 4C. It is typically possible for a release of the negative pressure to be achieved, in particular by a reduction or withdrawal of the negative pressure and/or by an application of pressure, typically positive pressure, to the pressure system 116. The release of the negative pressure is typically realized by an inflow of a fluid, in particular air, for example in the direction of the arrows leading through the connections 136 as illustrated in FIG. 4C. In particular, by the inflowing air, the surface of the suction calotte 112 and the sealing edge 128 can be separated from one another, whereby the gap 148 forms again and the friction, in particular the friction force, between the suction calotte 112 and the counterpart 114 is eliminated. Typically, a pressure force generated by the inflowing air and/or a gravitational force acts in the direction of the solid arrows illustrated in FIG. 4B, such that the article 142, in particular the lens, typically the spectacle lens, can detach from the suction gripper system 110.

Furthermore, the method illustrated in FIG. 3 comprises a method step 152 which, as per step e), comprises a return of the suction gripper system 110 into the initial state by a magnetic interaction of the ball 120 and the magnetic element 124. Typically, the suction gripper system 110 is returned into the initial state, for example into the initial state of the suction gripper system 110 as illustrated in FIG. 1A, by the magnetic forces which act owing to the magnetic interaction between the ball 120 and the magnetic element 124.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

110 Suction gripper system
112 Suction calotte
114 Counterpart
116 Pressure system
118 First element
120 Ball
122 Second element
124 Magnetic element
125 Suction attachment
126 Cavity
128 Sealing edge
130 Deflection stop
132 Ball receptacle
134 Housing cover
136 Connection
138 Step a): providing a suction gripper system in an initial state
140 Step b): positioning the suction gripper system in relation to the article to be handled
142 Article
144 Surface
146 Step c): generating a negative pressure for the handling of the article
148 Gap
150 Step d): releasing the negative pressure in order to end the handling of the article
152 Step e): returning the suction gripper system into the initial state through a magnetic interaction of the ball and of the magnetic element

The invention claimed is:

1. A suction gripper system for handling of at least one article, the suction gripper system comprising:
    a suction calotte configured to handle the at least one article;
    a counterpart configured correspondingly to the suction calotte;
    a magnetic element; and
    a movably mounted magnetizable ball,
    wherein the magnetic element and the movably mounted magnetizable ball are configured to interact magnetically with respect to one another to influence a spatial position of the suction calotte in relation to the counterpart.

2. The suction gripper system according to claim 1, wherein the counterpart is configured to receive the movably mounted magnetizable ball or the magnetic element, and
    wherein the suction calotte is configured to receive another one of the movably mounted magnetizable ball or the magnetic element.

3. The suction gripper system according to claim 1, wherein the suction calotte comprises a suction attachment configured to adapt to a part of a surface of the at least one article and to close off the part of the surface of the at least one article air-tightly.

4. The suction gripper system according to claim 1, further comprising:
    a cavity formed between the counterpart and the suction calotte, wherein the cavity is configured to be closeable air-tightly.

5. The suction gripper system according to claim 4, wherein the counterpart further comprises a sealing edge, and
    wherein the cavity configured to be closable air-tightly further comprises a region of the surface of the suction calotte and the sealing edge being joined together.

6. The suction gripper system according to claim 5, wherein the suction calotte has a deflection stop that is fixedly connected thereto and configured to restrict a relative movement of the suction calotte with respect to the counterpart, and wherein the sealing edge is configured to limit a movement of the deflection stop.

7. The suction gripper system according to claim 1, wherein the movably mounted magnetizable ball makes contact with the magnetic element at least at one point.

8. The suction gripper system according to claim 1, wherein the magnetic element is selected from a permanent magnet and an electromagnet.

9. The suction gripper system according to claim 1, wherein the magnetic element is configured as a magnetic disc or as a spherical calotte.

10. The suction gripper system according to claim 9, wherein the spherical calotte has a complementary shape to the movably mounted magnetizable ball, a surface of the suction calotte facing towards the counterpart, or a surface of the counterpart facing towards the suction calotte.

11. The suction gripper system according to claim 1, further comprising:

a ball receptacle configured to receive the movably mounted magnetizable ball, wherein the movably mounted magnetizable ball is permanently moveable, and wherein the ball receptacle is further configured to permit at least one of a rotational movement of the ball or a limited translational movement of the ball in at least one direction.

12. The suction gripper system according to claim 1, wherein the counterpart is configured as a housing, and wherein the housing has a housing cover configured to permit introduction of the movably mounted magnetizable ball into the counterpart.

13. A method for handling of at least one article, the method comprising the steps of:

a) providing a suction gripper system in an initial state, the suction gripper system having:

a suction calotte configured to handle the at least one article;

a counterpart that is configured correspondingly to the suction calotte;

a magnetic element; and a movably mounted magnetizable ball configured to interact magnetically with the magnetic element;

b) positioning the suction gripper system in relation to the article to be handled;

c) generating a negative pressure to handle the article;

d) releasing the negative pressure to end the handling of the article; and e) permitting a magnetic interaction of the movably mounted magnetizable ball and the magnetic element to return the suction gripper system into the initial state, wherein a spatial position of the suction calotte in relation to the counterpart is influenced by the magnetic interaction between the magnetic element and the movably mounted magnetizable ball during at least one of step b) or e).

14. The method according to claim 13, further comprising:

generating a negative pressure to fix the suction calotte relative to the counterpart.

15. A method for producing at least one spectacle lens, the method comprising:

handling the at least one the spectacle lens during a production thereof according to the method of claim 13.

16. A process of handling of at least one article with a suction gripper system, the process comprising:

providing a suction gripper system having:

a suction calotte configured to handle the at least one article;

a counterpart that is configured correspondingly to the suction calotte;

a magnetic element; and a movably mounted magnetizable ball configured to interact magnetically with the magnetic element;

selecting an optical element as the article; and influencing a spatial position of the suction calotte in relation to the counterpart.

* * * * *